United States Patent [19]

Clohessy

[11] Patent Number: 4,627,512
[45] Date of Patent: Dec. 9, 1986

[54] AIR ACTUATED CLUTCH FOR FOUR WHEEL DRIVE VEHICLES

[75] Inventor: Kip E. Clohessy, Portland, Oreg.

[73] Assignee: Warn Industries, Inc., Bellevue, Wash.

[21] Appl. No.: 722,659

[22] Filed: Apr. 12, 1985

[51] Int. Cl.⁴ ............................................. F16D 43/28
[52] U.S. Cl. .................... 180/247; 192/3.59; 192/20; 192/85 V
[58] Field of Search ............... 180/247, 249, 233, 245, 180/251; 192/3.59, 85 V, 67 R, 20, 21

[56] References Cited

U.S. PATENT DOCUMENTS

| | | | |
|---|---|---|---|
| 2,948,557 | 8/1960 | Howe | 192/67 R |
| 3,753,479 | 8/1973 | Williams | 192/67 R |
| 4,271,722 | 6/1981 | Campbell | 180/247 |
| 4,282,949 | 8/1981 | Kopich | 180/247 |
| 4,381,828 | 5/1983 | Lunn | 180/247 |
| 4,407,387 | 10/1983 | Lindbert | 180/247 |
| 4,452,331 | 6/1984 | Lunn | 180/247 |

Primary Examiner—John J. Love
Assistant Examiner—Everett G. Diederiks, Jr.
Attorney, Agent, or Firm—Robert L. Harrington

[57] ABSTRACT

A control system for a four wheel drive vehicle wherein the front wheels (or rear wheels in a conventional front wheel drive set up) are automatically engaged and disengaged from the vehicle drive train at both the transfer case and at the front wheel hubs. The engagement and disengagement at the transfer case is accomplished with conventional controls. The engagement and disengagement between the axles and wheel hubs is accomplished by providing concentric gear teeth portions in overlaping sections of the axle and wheel hub. A clutch ring with corresponding gear teeth is moved into and out of simultaneous engagement with the wheel hub and axle to lock them together. A pressure chamber having a movable wall associated with the clutch ring, is connected by an air line and control valve to the intake manifold of the vehicle's engine. A three-way valve selectively and alternatively opens the chamber to the manifold and to atmospheric pressure to thereby move the clutch ring between engagement and disengagement positions with the axle and hub. Atmospheric air is continuously provided to the clutch ring opposite the pressure chamber through a vent and powder metal filter.

10 Claims, 5 Drawing Figures

AIR ACTUATED CLUTCH FOR FOUR WHEEL DRIVE VEHICLES

FIELD OF INVENTION

This invention relates to a mechanism for automatically engaging and disengaging the wheels of a vehicle with the vehicle's drive system, and more particularly to the engagement and disengagement of one or the other of the front or rear wheels of a four wheel drive vehicle.

BACKGROUND OF INVENTION

In a conventional rear wheel driven vehicle, the engine acts through a transfer case to drive a propeller shaft. The propeller shaft extends back to the rear wheel axles where it engages and turns the axles (through a rear differential) and then the rear wheels. The simple driving of the rear wheels provides all the traction that is required for well over 90% of vehicle travel that takes place. Furthermore, to drive all four wheels requires a second propeller shaft projected forwardly to turn the front wheel axles and in turn the front wheels. Obviously, a front and rear wheel drive set up means more moving parts, more parts to wear out and maintain etc.

Even though rear wheel drive only is satisfactory most of the time, there are driving conditions where a four wheel drive vehicle is necessary e.g. off-road driving, winter driving on snow covered roads, etc. The extra traction that is provided with four wheels versus two wheels makes a significant difference under such conditions. Thus, individuals who drive under these latter road conditions e.g. snow skiers, hunters and the like, require the extra traction of four wheel driving.

To accommodate the market for four wheel drive vehicles, it has to be appreciated that most of the driving of such vehicles will still occur on roads where simple rear wheel driving is not only adequate but preferable. This situation has dictated the design of four wheel drive vehicles that includes a clutch mechanism for engaging and disengaging the vehicle's drive mechanism with the front wheels (or rear wheels if the vehicle is designed with full-time front wheel drive). such clutch mechanism is typically provided at two locations i.e. at the transfer case where the front propeller shaft is engaged and disengaged with the drive mechanism of the engine, and at the wheel hub of each front wheel where the front wheels are engaged and disengaged with the front wheel axles. To disengage one and not the other would result in the continued driving of the front propeller shaft, differential mechanism and front axles, either by the front wheels (with transfer case disengaged only) or by the engine drive mechanism (with front wheel disengagement only).

Typically in a four wheel drive vehicle, a two part clutch engagement and disengagement mechanism is employed. A shift lever is provided in the vehicle's cab that is linked to the transfer case as one part of the clutch mechanism, and a hub lock mechanism is provided in each front wheel hub as the second part of the clutch mechanism. Note, however, that the hub lock mechanism is accessible to the outside of the front wheels only and is engaged manually, requiring the driver to stop the vehicle, get out of the vehicle cab and manually engage the hub lock of each front wheel.

BRIEF DESCRIPTION OF THE INVENTION

The present invention is directed to that part of the clutch mechanism that effects the engagement and disengagement of the front wheels from the wheel axles. More specifically, the invention is directed to a mechanism that enables the driver to achieve this front wheel engagement and disengagement from the vehicle cab while the vehicle is moving. (Note that reference is made to a front wheel clutch mechanism only but the reader is to understand that the invention is applicable to a vehicle having full time front wheel drive and part time rear wheel drive, i.e. wherein the clutch mechanism is provided for the rear wheels).

Briefly, said front wheel clutch mechanism is provided by a clutch ring that is movable into and out of a position between the wheel hub and the wheel axle. Gear teeth appropriately provided on the clutch ring are engagable by mated gear teeth on both the hub and axle. The clutch ring when moved into position between the hub and axle interlocks with both and thus locks the axle and hub together.

The movement of the clutch ring into and out of locking engagement is achieved by air pressure. An air line from the vehicle engine's manifold produces a negative air pressure to move the clutch ring into one position. Atmospheric air replaces the air pressure from the manifold to initiate movement of the clutch ring to a second position. Valve controls manipulated inside the vehicle cab controls whether the manifold air or atmospheric air is comunicated to the mechanism. The atmospheric air is vented to the mechanism through a power metal air filter to avoid dust contamination of the mechanism.

DETAILED DESCRIPTION AND DRAWINGS

The invention will be more clearly understood by reference to the following detailed description of a preferred embodiment having reference therein to the accompanying drawings wherein.

Figure 1:
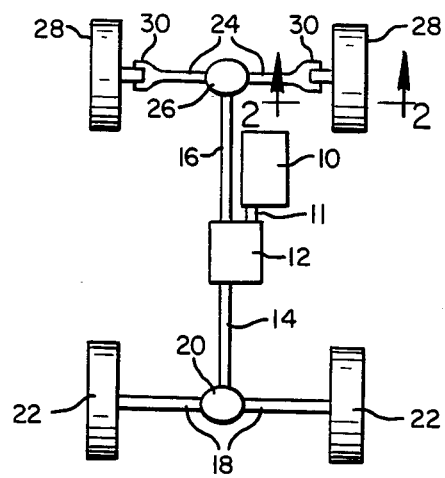
FIG. 1 is a schematic illustration of the drive system of a four wheel drive vehicle in accordance with the present invention.

Reference is made to FIG. 1 of the drawings wherein the drive mechanism of a four wheel drive vehicle is illustrated. Rotative power from the vehicle's engine 10 is transmitted by drive shaft 11 to a transfer case 12, then through the transfer case to a rear wheel drive propeller shaft 14 and a front wheel drive propeller shaft 16. The rear wheel drive propeller shaft 14 is engaged with the rear wheel axes 18 through the rear differential 20 (inside the transfer case 12) to drive rear wheels 22. The front wheel propeller shaft 16 is engaged with the front wheel axles 24 through the front differential 26 to drive the front wheels 28. The front wheels being steerable are provided with steering knuckles generally illustrated by reference numeral 30.

Whereas the rear propeller shaft 14 is directly coupled to drive shaft 11, the coupling that interconnects the drive shaft 11 to the front propeller shaft 16 is selectively activated by the operator of the vehicle. Thus when two wheel drive is preferred, the drive shaft 11 and propeller shaft 16 are disengaged at the interconnection within the transfer case 12. The reader is to understand that engagement and disengagement thereof takes place in conjunction with the hub interlock mechanism of the invention. However, the mechanism for accomplishing engagement and disengagement of the propeller shaft 16 and drive shaft 11 is well known and further explanation of the mechanism inside the transfer case 12 for accomplishing these functions is not deemed necessary and is not provided herein.

Figure 2:
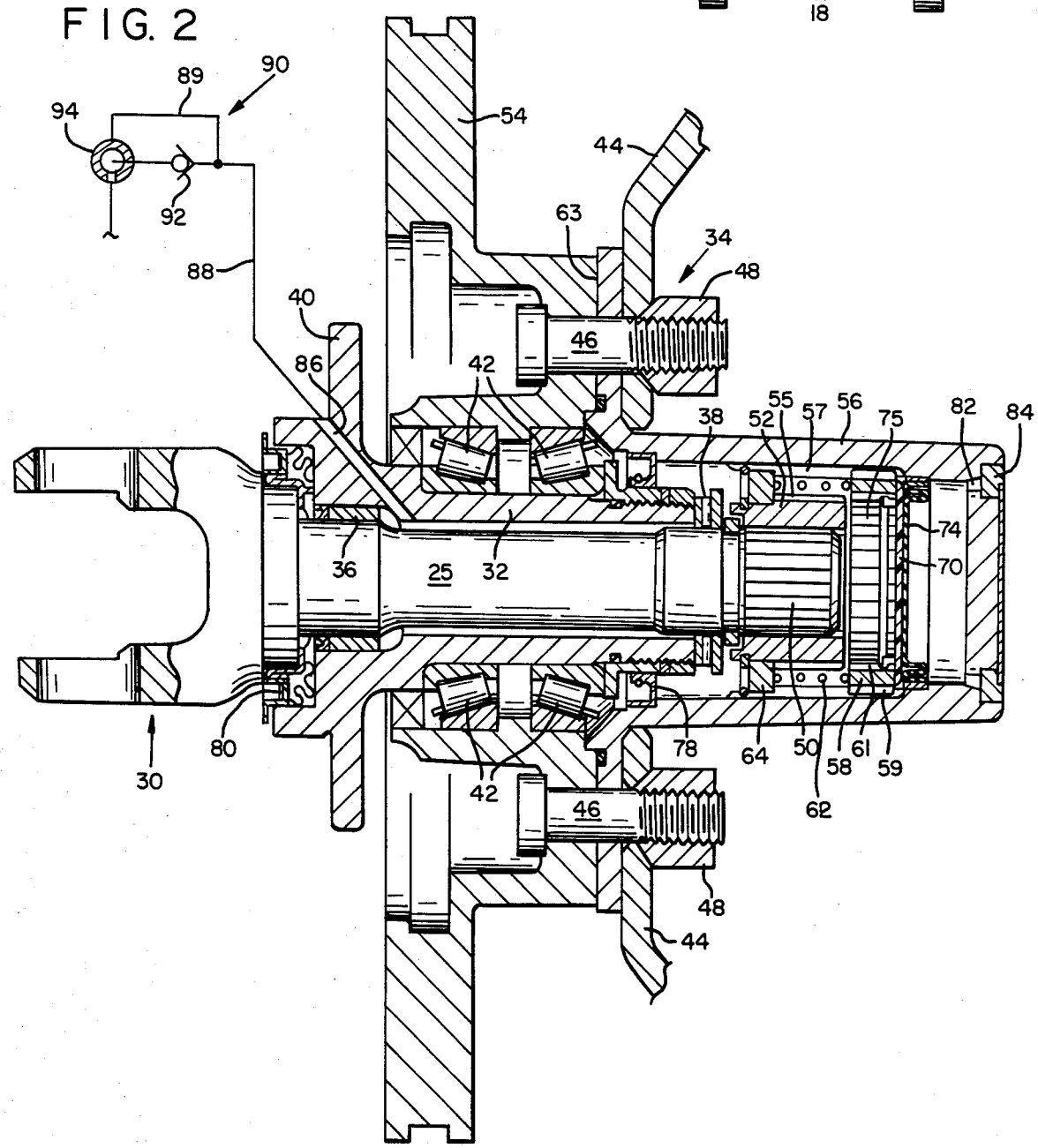
FIG. 2 is a cross sectional view of a front wheel portion of the drive system generally indicated in FIG. 1 by view lines 2—2, illustrating the clutch mechanism in the disengaged position.
Figure 5:
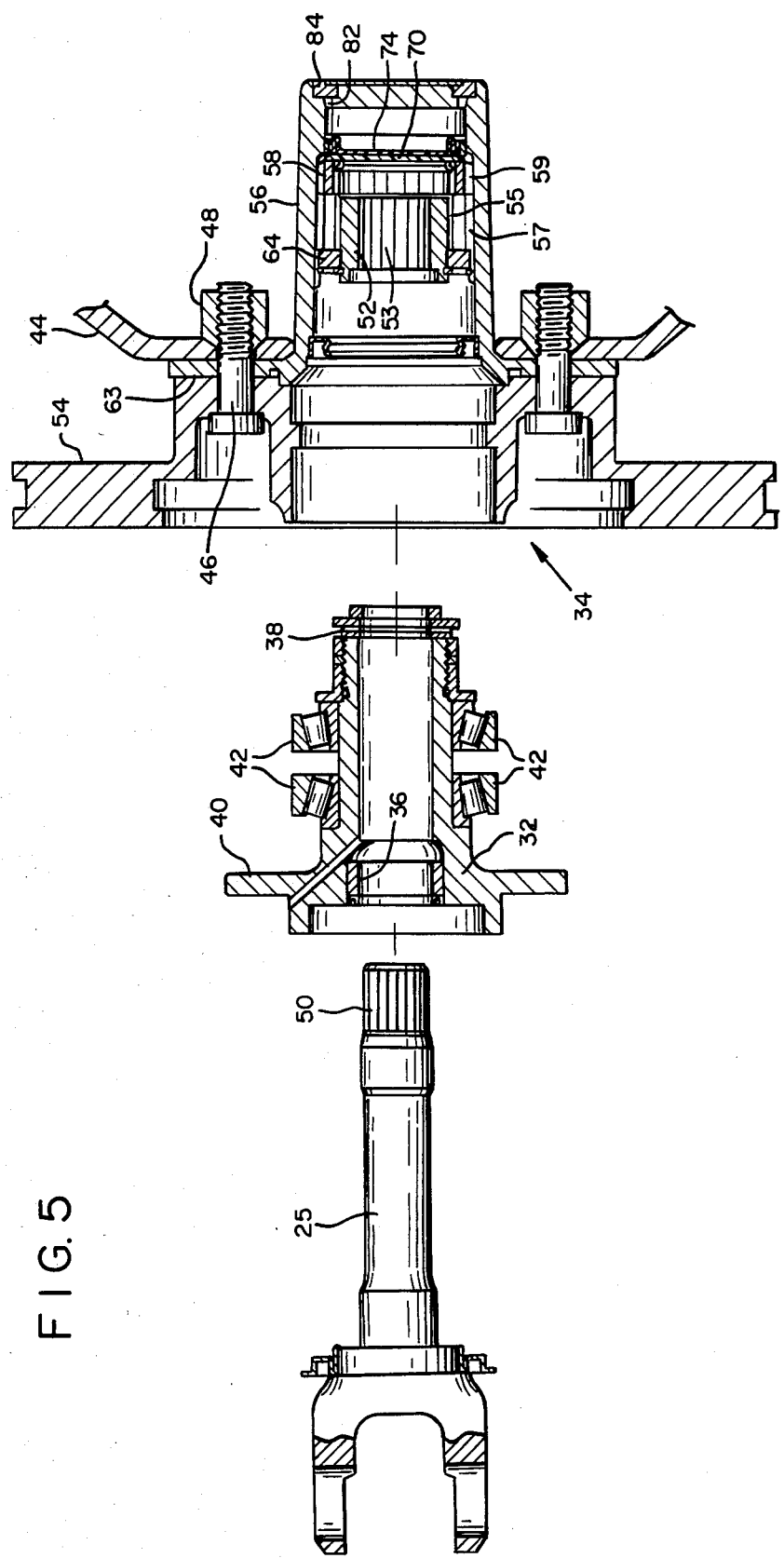
FIG. 5 is an exploded view of the major components of FIG. 2.

Reference is made to FIG. 2 wherein the mechanism for activating the hub interlock is illustrated. Note from the view lines 2—2 in FIG. 1 that this mechanism is provided for the right front wheel and includes that portion outward of steering knuckle 30. An axle portion 25 outward of knuckle 30 is rotatively fixed to the inner axle portion 24. As concerns the four wheel driving functions of this invention, axle portion 25 is simply an extension of axle 24. Now compare FIGS. 2 and 5 and note that the axle portion 25 is rotatively supported in spindle 32 as by bearing members 36 and 38. Spindle 32 is fixed against rotation e.g. by bolts through flanges 40 fastened to the vehicle frame in a manner common for axle assemblies and not shown in detail. The hub assembly 34 is rotatively carried by the spindle 32 as by bearing members 42.

From the above, it will be understood that the spindle 32 is fixed, axle 25 rotates on the inside of the spindle, and the hub assembly 34 rotates on the outside of the spindle. The hub assembly 34 carries the vehicle's wheel 28 generally indicated in FIG. 2 by the wheel frame 44 being bolted (by bolts 46 and nuts 48) to the hub assembly. Whereas axle 24 is selectively rotatively driven by interengagement of drive shaft 11 with propeller shaft 16 at the transfer case 12, axle portion 25 is correspondingly driven (supported on bearings 36, 38) within spindle 32. Driving of the hub assembly 34 is accomplished by interengagement of axle portion 25 with the hub assembly 34 which will not be explained.

Reference is made to FIGS. 2, 3, 4, and 5. As will be appreciated from FIG. 2, the axle portion 25 extends through the spindle 32 with an end portion protruding out of the spindle, which end portion is provided with gear teeth 50. An inner drive gear ring 52 having both internal gear teeth 53 and external gear teeth 55, is fixed to the axle end through meshing of gear teeth 53 with gear teeth 50. The inner drive gear ring 52 thus rotates with rotation of the axle 24. In effect, the drive gear ring 52 forms the outer end of axle portion 25 having gear teeth 55.

The hub assembly 34 includes two basic components i.e. a hub and rotor component 54 and a hub component 56. The hub and rotor component carries the bearings 42 and provides the fastening means by which the wheel 28 is fastened to the hub assembly 34. The hub lock component 56 is attached to the hub and rotor component (at interface 63) and houses the mechanism for interlocking the hub assembly to the axle portion 25. As will be noted from the figures, the hub lock component is a cup-like cap that fits over and surrounds the gear teeth 55 of the inner drive gear ring 52 that is fixed to the axle end. The internal wall of the hub lock component 56 surrounding the inner drive gear 52 is provided with elongated gear teeth 57 that are spaced from gear teeth 55 and thus are not engaged with gear teeth 55.

Figure 3:
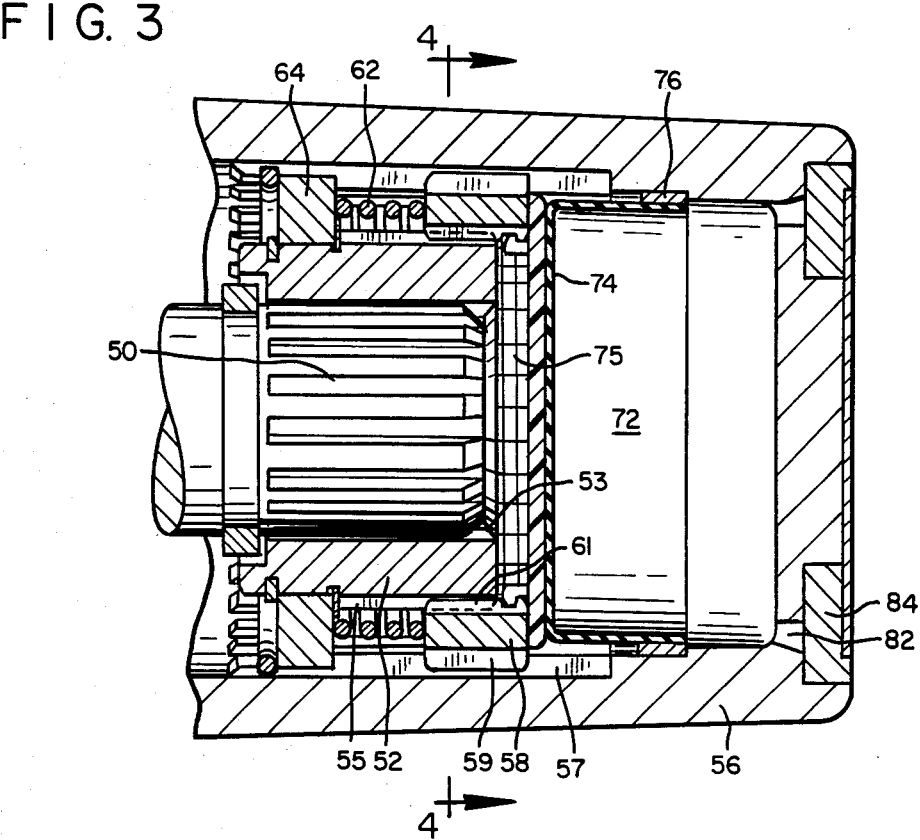
FIG. 3 is an enlarged view of a portion of the wheel section of FIG. 2 but illustrating the clutch mechanism in the engaged position.
Figure 4:
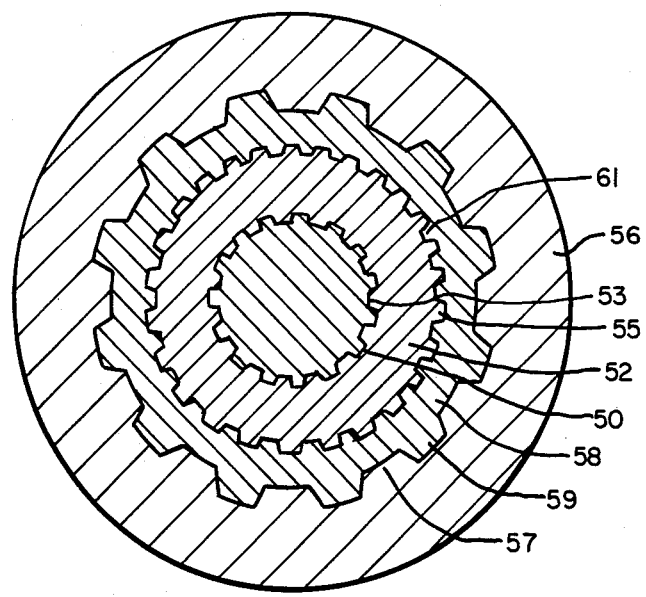
FIG. 4 is a view taken on view lines 4—4 of FIG. 3.

Positioned within the hub lock component is an axially slidable clutch ring 58 having external gear teeth 59 that are permanently engaged with the gear teeth 57 of the hub lock component (i.e. the gear teeth 59 of the clutch ring 58 are slidable along the elongated gear teeth 57 of the hub lock component). The clutch ring 58 also has internal gear teeth 61 that are mated to the gear teeth 55 of the inner drive gear 52. Clutch ring 58 is movable in the hub lock between an extended position where gear teeth 61 are not engaged with the drive gear 52 (the position of FIG. 2) and a retracted position with gear teeth 61 engaging the gear teeth 55 of the drive ring gear 52 (the position of FIG. 3). Thus it will be appreciated that, with the clutch ring 58 retracted, as illustrated in FIG. 3, the hub assembly 34 is interlocked with the axle portion 25 and thus axle 24, and with the propeller shaft 16 connected to the drive shaft 11, the front wheels 28 are driven by the vehicle engine 10.

The mechanism for actuating movement of the clutch ring 58 along the gear teeth 57 of the hub lock component 56 and thereby into and out of engagement with the drive gear ring 52, will not be explained. As seen in FIGS. 2 and 3, the clutch ring 58 is urged to its extended position i.e. out of engagement with drive gear 52 (FIG. 2 position), by a coil spring 62 that is compressed between the clutch ring 58 and a support ring 64 which is fixed to the drive gear 52 e.g. by lock rings. The clutch ring 58 is urged to its retracted position i.e. against the urging of the coil springs 62 (FIG. 3 position), by a plate 70 axially movable within a chamber 72 formed in the hub lock component 56. The plate 70 is sealed from the opposite side i.e. an air tight chamber 75, by a pliable membrane 74 that is bonded to the plate 70 and to a seal ring 76 encircling the wall of chamber 72. The plate 70 provides the movable wall of an expansion chamber i.e. air tight chamber 75, wherein the axle end 50, drive ring 52 and clutch ring 58 reside. The inner end of chamber 75 is sealed from atmospheric pressure by sealing ring 78 (between the spindle and hub lock housing) and by sealing ring 80 (between the spindle and axle adjacent the knuckle 30). It will thus be understood that if a vaccum is drawn in the expansion or air tight chamber 75, the atmospheric pressure in chamber 72 (vented to the atmosphere through portals 82 and a stainless steel power metal filter 84) will force inward movement of the plate 70 and clutch ring 58, and thus interengagement of the clutch ring gear teeth 61 with drive gear teeth 55. With chamber 75 opened to atmospheric pressure (which will be shortly explained) the plate 70 is urged by spring 62 to retract the clutch ring 58 and disengage the clutch ring gear teeth 61 from the drive gear teeth 55.

Referring now specifically to FIG. 2, the vaccum pressure within the vaccum chamber 75 is controlled through orifice 86 provided in the fixed spindle 32. An air line 88 shown schematically in FIG. 2, extends from the orifice 86, through control valve 90 to the engine intake manifold (not shown). The control valve 90 includes a one way check valve 92 and a three-way, normally closed solenoid actuated valve 94 (hereafter referred to as switching valve 94). The switching valve 94 is of typical design and need not be described except as to its function. Thus, with a vaccum being continuously drawn from switching valve 94 (due to the connection with the engines intake manifold) switching the valve 94 need simply be opened by activation of the solenoid switch to draw a vaccum from the chamber 75 which is permitted by the one way valve 92 in line 88. The one way valve 92 will prevent return air movement and thus loss of a vaccum pressure in chamber 75 during brief engine speed interruptions e.g. when climbing a steep hill resulting in engine pull and reduction of manifold air intake. Reverse activation of the solenoid of valve 94 closes line 88 to the manifold air intake pressure and opens the line to atmospheric pressure. Atmospheric air bypasses check valve 92 through bypass line 89 and pressurizes the vacuum chamber 75 to balance the pressure with that of chamber 72, thereby permitting return of the clutch ring 58 as urged by spring 62. Air pressure in chamber 72 is maintained at atmospheric air pressure through vent holes 82 and filter 84. The powder metal filter 84 is an important component to avoid dust contamination that may impair the functions of the clutch mechansim.

OPERATION

The vehicle of the present invention is adapted to switch from rear wheel drive only to four wheel drive. In the rear wheel drive only mode, the propeller shaft 16 is disconnected from the drive shaft 11 within the transfer case 12. The axle 24 (and axle portion 25) is disconnected from the hub assembly 34 by deactivation of the solenoid switch of switching valve 94 (i.e. the clutch ring 58 is forced out of engagement with the drive gear 52 by the urging of spring 62). In this condition none of the drive components between the transfer case 12 and hub assembly 34 are being driven. The hub assembly rotates by reason of the wheels 28 engaging the roadway.

When it is desirable to switching to four wheel drive, the operator simply activates a switch mechanism that in turn activates the dual clutch functions. The propeller shaft 16 is thereby connected to the drive shaft 11 to drive the axle 24, and switching valve 94 closes the valve 90 to atmospheric pressure and opens it to the vaccum pressure of the intake manifold. This draws negative pressure in vaccum chamber 75 and, whereas atmospheric pressure is provided to the outside of plate 70 (through portals 82), the pressure imbalance forces collapse of spring 62 and movement of clutch ring 58 into engagement with drive gear 52. The hub assembly 34 is thereby interlocked with driven axle 24, 25 to positively drive wheels 28.

Having thus described in detail a preferred embodiment of the invention, it will be appreciated that numerous modifications, alternatives, and improvements may be made without departing from the scope of the inventive concept which is specifically defined in the claims appended hereto.

I claim:

1. A control system for selectively engaging and disengaging a vehicle wheel and a vehicle drive mechanism comprising;

a spindle having inside and outside rotative support surfaces, said spindle adapted to be mounted to a vehicle frame, an axle portion rotatably supported on the inside support surface, and drive means for selectively and rotatively driving said axle portion relative to said spindle;

a wheel hub assembly adapted to carry a vehicle wheel, said hub assembly rotatively supported on the outside support surface of said spindle, a first set of gear teeth provided on said axle portion and a second set of gear teeth provided on said hub assembly, and a clutch ring having first and second sets of gear teeth that mate with the first and second sets of gear teeth on the axle portion and hub assembly, said clutch ring being mounted on one of the axle portion and hub assembly in gear meshing relationship with the gear teeth thereof, and being movable between a gear meshing interlocking relationship and a non-gear meshing unlocking relationship with the gear teeth of the other of the axle portion and hub assembly;

a sealed expansion chamber defined in part by the spindle, the axle portion, the hub assembly and a movable wall carried by the hub assembly, venting means venting the outer side of the movable wall to atmospheric pressure, said clutch ring engaged by said movable wall for movement of the clutch ring with movement of the movable wall as induced by a pressure difference generated within said chamber, and pressurizing means for selectively pressurizing and depressurizing the expansion chamber to thereby selectively shift the clutch ring between the positions of interlocking the axle portion and hub assembly and unlocking the axle portion and hub assembly.

2. A control system as defined in claim 1 including a vaccum source, control means selectively and alternatively interconnecting the expansion chamber to the vaccum source and atmospheric pressure whereby connection to the vaccum source moves the clutch ring to one of the interlocking and unlocking positions, and biasing means biasing the clutch ring to the other of the positions upon connection of the expansion chamber to atmospheric pressure.

3. A control system as defined in claim 2 wherein the vehicle includes an engine having an air intake manifold, and air transfer means including an air orifice through the spindle portion forming a part of the expansion chamber through which said manifold provides the vacuum source for the expansion chamber.

4. A control system as defined in claim 1 wherein a second expansion chamber is provided on the outer side of the moveable wall, venting means is provided to vent the second expansion chamber to the atmosphere to maintain constant atmospheric pressure on said outer side of the movable wall, and a filter is provided as a part of the venting means to prevent dust contamination of the second expansion chamber and impairment of the clutch ring function.

5. A control system as defined in claim 4 wherein said filter is a powder metal filter.

6. A control system for selectively engaging and disengaging a vehicle wheel with a vehicle drive mechanism comprising; a vehicle having a frame, a pair of rear wheels having rear wheel axles and pair of front wheels having front wheel axles, an engine, a transfer case, a drive shaft rotatively driven by the engine and connected into the transfer case, a rear wheel drive propeller shaft interconnected with the rear wheel axles and a front wheel drive propeller shaft interconnected with the front wheel axles, each of said propeller shafts connected into the transfer case and one of which is directly connected to the drive shaft and wheel axles associated therewith, and a first control means connected to the transfer case for selectively interconnecting the drive shaft to the other of the propeller shaft and interconnected wheel axles, and the improvement which comprises;

a spindle for each axle of said other wheel axles mounted to the vehicle frame, each wheel axle protruding through the respective spindle and mounted therein for free rotative movement relative to the spindle, a wheel hub assembly mounted on the spindle and have free rotative movement about said spindle, said wheel hub assembly extended past the spindle and having an extended portion in close adjacency to the protruding end of the axle, first and second spaced apart gears having teeth provided on the protruding axle end and adjacent wheel hub assembly portion respectively, and a clutch ring having gear teeth, said clutch ring being movable into and away from simultaneous engagement with the teeth of both said first and second spaced apart gears of the axle and wheel hub, a second control means for controlling the movement of the clutch ring including an air sealed chamber defined in part by the spindle, the axle, the hub assembly and a movable wall carried by the hub assembly, said movable wall having inside and outside wall surfaces, said wall being movable in response to pressure differential between the inside and outside wall surfaces, said movable wall engaging the clutch ring to move the clutch ring into engagement with the gear teeth of the axle and wheel hub, and biasing means biasing the clutch ring to the disengaged position upon equalization of the pressure on the inside and outside wall surfaces;

vacuum means for pressurizing and depressurizing the air sealed chamber including an air intake manifold forming part of the vehicle engine, air transfer means between the chamber and the intake manifold for creating a negative air pressure in the chamber, air control valve means associated with said air transfer means to selectively and alternatively open the chamber to the air intake manifold and atmospheric pressure to thereby pressurize and depressurize the chamber.

7. A control system as defined in claim 6 wherein the clutch ring is continuously engaged with the gear teeth of the wheel hub and selectively engaged with the gear teeth of the axle, and biasing means provided by a coil spring acting against the clutch ring to urge the clutch ring out of engagement with the gear teeth of the axle.

8. A control system as defined in claim 7 wherein the sealed chamber is formed in part between the interface of the spindle and axle portion and said air transfer means is formed in part by an orifice through the spindle and into the sealed chamber at the interface between the spindle and axle portion.

9. A control system as defined in claim 8 wherein a one way valve is provided within the air transfer means such that air transfer is permitted only from the chamber to the air intake manifold, and a bypass air transfer means bypassing said one way valve to connect the chamber to atmospheric pressure as permitted by said air control valve means.

10. A control system as defined in claim 9 wherein said air control valve means is a three-way solenoid activated valve that is switch operated by the vehicle operator to interconnect the chamber to the air intake manifold for interengaging the wheel hub and axle portion, and to interconnect the chamber to atmospheric pressure through said bypass air transfer means for disengaging the wheel hub and axle portion.

* * * * *